United States Patent
Bentley et al.

(10) Patent No.: US 8,788,376 B2
(45) Date of Patent: Jul. 22, 2014

(54) SYSTEM, METHOD AND COMPUTER PROGRAM PRODUCT FOR AN ACQUISITION PARTNER INTERFACE FOR INTEGRATING MULTIPLE PARTNER CHANNELS INTO A TRANSACTION ACCOUNT ISSUER PLATFORM

(75) Inventors: Simon R. Bentley, East Sussex (GB); Deborah Louise Craft, Brooklyn, NY (US); Melanie Anne Dunn, New York, NY (US); Adeyemi O. Kayode, Litchfield Park, AZ (US); Chintan M. Mehta, Phoenix, AZ (US); Denis George Perracchio, Peoria, AZ (US); Sejal Dilip Vora, New York, NY (US)

(73) Assignee: III Holdings 1, LLC, Wilmington, DE (US)

( * ) Notice: Subject to any disclaimer, the term of this patent is extended or adjusted under 35 U.S.C. 154(b) by 2465 days.

(21) Appl. No.: 11/275,066

(22) Filed: Dec. 7, 2005

(65) Prior Publication Data
US 2007/0198438 A1 Aug. 23, 2007

(51) Int. Cl.
*G06Q 40/00* (2012.01)

(52) U.S. Cl.
USPC .......................................................... 705/35

(58) Field of Classification Search
USPC .......................................................... 705/35
See application file for complete search history.

(56) References Cited

U.S. PATENT DOCUMENTS

| | | | |
|---|---|---|---|
| 4,694,397 A | 9/1987 | Grant et al. | |
| 4,751,640 A | 6/1988 | Lucas et al. | |
| 4,823,265 A | 4/1989 | Nelson | |
| 4,992,940 A | 2/1991 | Dworkin | |
| 5,220,501 A | 6/1993 | Lawlor et al. | |
| 5,239,462 A | 8/1993 | Jones et al. | |
| 5,262,942 A | 11/1993 | Earle | |
| 5,274,547 A | 12/1993 | Zoffel et al. | |
| 5,463,555 A | 10/1995 | Ward et al. | |
| 5,611,052 A | 3/1997 | Dykstra et al. | |
| 5,615,408 A | 3/1997 | Johnson et al. | |
| 5,677,955 A | 10/1997 | Doggett et al. | |
| 5,694,551 A | 12/1997 | Doyle et al. | |
| 5,696,907 A | 12/1997 | Tom | |
| 5,706,442 A | 1/1998 | Anderson et al. | |
| 5,710,889 A | 1/1998 | Clark et al. | |
| 5,745,706 A | 4/1998 | Wolfberg et al. | |
| 5,758,327 A | 5/1998 | Gardner et al. | |
| 5,758,329 A | 5/1998 | Wojcik et al. | |
| 5,765,142 A | 6/1998 | Allred et al. | |

(Continued)

OTHER PUBLICATIONS www.gmcard.com.

(Continued)

*Primary Examiner* — Jessica Lemieux

(57) ABSTRACT

A system, method and computer program product for interfacing disparate partner systems to a transaction account issuer system is disclosed. A Web server receives a request from a disparate partner system, such as a Web service, a portal and/or a partner microsite and an application server extracts a partner identifier from the request. In turn, a delegate engine delegates actions corresponding to the request to one or more handlers using predetermined rules associated with the partner identifier. A worker manager manages worker code blocks which perform the actions based on a subset of the predetermined rules associated with the partner identifier. The Web server then communicates an outcome to the partner system based on the actions performed by the worker code blocks.

19 Claims, 4 Drawing Sheets

(56) References Cited

U.S. PATENT DOCUMENTS

| | | | |
|---|---|---|---|
| 5,774,882 A | 6/1998 | Keen et al. | |
| 5,787,404 A | 7/1998 | Fernandez-Holmann | |
| 5,797,133 A | 8/1998 | Jones et al. | |
| 5,842,178 A | 11/1998 | Giovannoli | |
| 5,866,889 A | 2/1999 | Weiss et al. | |
| 5,870,721 A | 2/1999 | Norris | |
| 5,878,403 A | 3/1999 | DeFrancesco et al. | |
| 5,890,140 A | 3/1999 | Clark et al. | |
| 5,893,076 A | 4/1999 | Hafner et al. | |
| 5,899,982 A | 5/1999 | Randle | |
| 5,913,202 A | 6/1999 | Motoyama | |
| 5,918,217 A | 6/1999 | Maggioncalda et al. | |
| 5,930,776 A | 7/1999 | Dykstra et al. | |
| 5,950,179 A | 9/1999 | Buchanan et al. | |
| 5,970,475 A | 10/1999 | Barnes et al. | |
| 5,970,476 A | 10/1999 | Fahey | |
| 5,974,395 A | 10/1999 | Bellini et al. | |
| 5,991,750 A | 11/1999 | Watson | |
| 6,009,406 A | 12/1999 | Nick | |
| 6,014,644 A | 1/2000 | Erickson | |
| 6,014,645 A | 1/2000 | Cunningham | |
| 6,018,723 A | 1/2000 | Siegel et al. | |
| 6,029,147 A | 2/2000 | Horadan et al. | |
| 6,029,149 A | 2/2000 | Dykstra et al. | |
| 6,032,184 A | 2/2000 | Cogger et al. | |
| 6,044,354 A | 3/2000 | Asplen, Jr. | |
| 6,055,516 A | 4/2000 | Johnson et al. | |
| 6,064,986 A | 5/2000 | Edelman | |
| 6,070,142 A * | 5/2000 | McDonough et al. | 705/7 |
| 6,088,686 A | 7/2000 | Walker et al. | |
| 6,105,007 A | 8/2000 | Norris | |
| 6,112,190 A | 8/2000 | Fletcher et al. | |
| 6,115,690 A | 9/2000 | Wong | |
| 6,119,104 A | 9/2000 | Brumbelow et al. | |
| 6,125,391 A | 9/2000 | Meltzer et al. | |
| 6,128,602 A | 10/2000 | Northington et al. | |
| 6,128,624 A | 10/2000 | Papierniak et al. | |
| 6,131,810 A | 10/2000 | Weiss et al. | |
| 6,135,349 A | 10/2000 | Zirkel | |
| 6,141,647 A | 10/2000 | Meijer et al. | |
| 6,151,588 A | 11/2000 | Tozzoli et al. | |
| 6,154,729 A | 11/2000 | Cannon et al. | |
| 6,163,771 A | 12/2000 | Walker et al. | |
| 6,370,573 B1 | 4/2002 | Bowman-Amuah | |
| 6,389,426 B1 | 5/2002 | Turnbull et al. | |
| 6,513,129 B1 | 1/2003 | Tentij et al. | |
| 6,571,285 B1 | 5/2003 | Groath et al. | |
| 6,629,135 B1 | 9/2003 | Ross, Jr. et al. | 709/218 |
| 6,941,306 B2 | 9/2005 | Kim | 707/10 |
| 7,370,335 B1 * | 5/2008 | White et al. | 719/328 |
| 7,464,057 B2 * | 12/2008 | Cole et al. | 705/42 |
| 2001/0044840 A1 | 11/2001 | Carleton | |
| 2002/0103905 A1 * | 8/2002 | Subramaniam | 709/225 |
| 2002/0152106 A1 | 10/2002 | Stoxen et al. | |
| 2002/0165936 A1 | 11/2002 | Alston et al. | 709/217 |
| 2002/0169851 A1 | 11/2002 | Weathersby et al. | 709/218 |
| 2002/0178213 A1 | 11/2002 | Parry | 709/203 |
| 2003/0200300 A1 | 10/2003 | Melchione | 709/223 |
| 2004/0133460 A1 * | 7/2004 | Berlin et al. | 705/9 |
| 2005/0015481 A1 * | 1/2005 | Blankenship | 709/224 |

OTHER PUBLICATIONS www.starbucks.com/card/duetto.asp.

USPTO; Advisory Action dated Apr. 2, 2010 in U.S. Appl. No. 10/718,004.

USPTO; Final Office Action dated Feb. 22, 2010 in U.S. Appl. No. 10/718,004.

USPTO; Office Action dated Oct. 14, 2009 in U.S. Appl. No. 10/718,004.

USPTO; Advisory Action dated Jul. 9, 2009 in U.S. Appl. No. 10/718,004.

USPTO; Office Action dated Mar. 19, 2009 in U.S. Appl. No. 10/718,004.

USPTO; Office Action dated Aug. 20, 2008 in U.S. Appl. No. 10/718,004.

USPTO; Office Action dated Jan. 17, 2008 in U.S. Appl. No. 10/718,004.

USPTO; Advisory Action dated Sep. 9, 2010 in U.S. Appl. No. 10/071,615.

USPTO; Final Office Action dated Jul. 9, 2010 in U.S. Appl. No. 10/071,615.

USPTO; Office Action dated Jul. 7, 2010 in U.S. Appl. No. 10/071,615.

USPTO; Advisory Action dated Sep. 30, 2009 in U.S. Appl. No. 10/071,615.

USPTO; Final Office Action dated Jun. 15, 2009 in U.S. Appl. No. 10/071,615.

USPTO; Office Action dated Nov. 26, 2008 in U.S. Appl. No. 10/071,615.

USPTO; Advisory Action dated Oct. 20, 2008 in U.S. Appl. No. 10/071,615.

USPTO; Final Office Action dated Jun. 9, 2008 in U.S. Appl. No. 10/071,615.

USPTO; Office Action dated Nov. 28, 2007 in U.S. Appl. No. 10/071,615.

USPTO; Advisory Action dated Oct. 17, 2007 in U.S. Appl. No. 10/071,615.

USPTO; Final Office Action dated May 4, 2007 in U.S. Appl. No. 10/071,615.

USPTO; Office Action dated Sep. 15, 2006 in U.S. Appl. No. 10/071,615.

USPTO; Office Action Restriction dated Jun. 15, 2006 in U.S. Appl. No. 10/071,615.

R Bentley, T Horstmann, J Trevor, "The World Wide Web as enabling technology for CSCW: The case of BSCW", Computer Supported Cooperative . . . , 1997, Springer.

M Guzdial, J Rick, B Kerimbaev, Recognizing and supporting roles in CSCWgatech.edu [PDF], . . . of the 2000 ACM conference on . . . , 2000, portal.acm.org.

J Bowers, G Button, W Sharrock, Workflow from within and without: Technology and cooperative work on the print . . . psu.edu [PDF], Proceedings of the fourth . . . , 1995—portal.acm.org.

JW Chang, CT Scott, Agent-based workflow: TRP support environment (TSE), Computer Networks and ISDN Systems, 1996, Elsevier.

S Bandinelli, E Di Nitto, Supporting Cooperation in the SPADE-1 environment, A . . . -IEEE Transactions . . . , 1996, doi.ieeecomputersociety.org.

Fearn et al. ("Designing Tivoli Solutions for End-to-End Systems and Service Management", Jun. 1999.

Cultivating customer loyalty, Communications News, v 36, No. 6, p. 56, Jun. 1999, Dialog 07044866 Supplier No. 57769200.

CardSystems and Maverick International Processing Services Merge to Form Next-Generation Application Service Provider. Business Wire, p. 0047, Oct. 5, 1999, Dialog 06693480 Supplier No. 55993027.

First Data, Netscape Jointly Deliver "First Real-Time On-Line Credit Card Authorisation System" Computer International, No. 2890, p. N/A, Apr. 11, 1996, Dialog 04296220 Supplier No. 46296433.

Internet Initiatives Loom Large for Serious Card Marketers, Card Marketing, v 3, No. 11, p. 1+, Dec. 1999, Dialog 02033896 Supplier No. 25515328.

American Express Enhances Membership B@nking with Free Quicken TurboTax Deluxe, 5.65% APY Money Market Rates, No-Fee Interest Checking, PR Newswire. New York: Feb. 1, 2000. pg. 1.

AmEx beefs up online investment services, Funds International. London: Nov. 25, 1999. p. 4.

American Express Launches Online Brokerage, PR Newswire. New York: Nov. 8, 1999. p. 1.

Lux, Hal. The search for the 'killer app', Institutional Investor. New York: Apr. 1997. vol. 31, Iss. 4; p. 91.

"The American Express Cards", Dec. 24, 1996 webpages from web.archive.org, pp. 1-4.

(56) References Cited

OTHER PUBLICATIONS

Essex, David. "Big Dreams for tiny money" Dec. 13, 1999, ComputerWorld, Framingham, vol. 33, Iss. 50,, p. 66, 1 pgs, ProQuest ID 47371441.

Schatz, Amy; "Credit card companies offer special plastic for buying on the web", Dec. 19, 1999, Austin American Statesman, p. E1, ProQuest ID 47331600.

USPTO; Notice of Allowance dated Jan. 27, 2011 in U.S. Appl. No. 10/071,615.

* cited by examiner

SYSTEM, METHOD AND COMPUTER PROGRAM PRODUCT FOR AN ACQUISITION PARTNER INTERFACE FOR INTEGRATING MULTIPLE PARTNER CHANNELS INTO A TRANSACTION ACCOUNT ISSUER PLATFORM

BACKGROUND OF THE INVENTION

1. Field of the Invention

The present invention generally relates to card acquisition partner interfaces, and more particularly to a system, method and computer program product for an acquisition partner interface for integrating multiple partner channels into a transaction account issuer platform to allow partner customers to apply for transaction accounts.

2. Related Art

Many transaction account issuers continue to be plagued with slowing market growth, and declining response rates. Account issuers also face new competitors and innovative loyalty programs, while emerging products continue to change the industry landscape. This is due in part to traditional customer acquisition channels experiencing declines in response rates and profitability. In addition, acquisition of new transaction account members takes time to achieve at a time when potential members want their applications processed quickly.

Issuers also must take into account that newer acquisition channels now use the Internet for business-to-business ("B2B") communication, and partner companies expect issuers to provide websites that can be rebranded. In addition, partner companies want their customers to have a seamless purchase experience, in order to complete all potential sales and build loyalty. These partners also are looking for revenue-sharing opportunities.

In light of these challenges, transaction account issuers are constantly searching for opportunities to increase the number of customers holding their transaction accounts and using their financial transaction instruments through cooperative relationships with other companies (herein referred to as "partners"). Attempts to establish connections between these partners and the internal acquisition systems of transaction account issuers have, in the past, resulted in custom-built interfaces for each external partner (sometimes referred to as "point solutions"). These custom built interfaces are not generally reusable across an enterprise. Some partners have attempted to use the transaction account issuer's Internet website. Such websites, however, are not easily rebranded to give the look and feel of the partner company. Nor do they provide customizable data validation and security mechanisms required by certain partners.

A need exists to increase new transaction account member acquisitions by creating distribution channels with partners which allow their customers to have a seamless purchase experience. There is also a need to increase transaction account member engagement by immediately extending credit (or approve debit) to customers (e.g., instant card usage). Yet another need exists to attract new partners with a competitive advantage in instant acquisition.

Given the foregoing, what is needed is a system, method and computer program product for an acquisition partner interface for integrating multiple partner channels into a transaction account issuer platform to allow partner customers to apply for transaction accounts.

BRIEF DESCRIPTION OF THE INVENTION

The present invention meets the above-identified needs by providing a system, method and computer program product for an acquisition partner interface for integrating multiple partner channels into a transaction account issuer platform to allow partner customers to apply for transaction accounts.

In one aspect of the invention, a system, method and computer program product are provided for interfacing disparate partner systems to a transaction account issuer system. A Web server receives a request from one of the disparate partner systems, which may be a Web service, a portal and/or a partner microsite. An application server extracts a partner identifier from the request, and a delegate engine delegates actions corresponding to the request to one or more handlers in accordance with predetermined rules associated with the partner identifier. A worker manager manages worker code blocks, that perform the actions based on a subset of the plurality of predetermined rules associated with the partner identifier. The Web server also communicates to the partner system an outcome based on the actions.

An advantage of the present invention is that it provides multiple technology channels to drive card acquisitions through strategic external partnerships.

Another advantage of the present invention is that it provides multiple options to a transaction account issuer's partners to connect to the transaction account issuer via various channels and differing degrees of desired customization.

Another advantage of the present invention is that it allows card members to be acquired via the partners' telephone, Web and in-person channels.

Yet another advantage of the present invention is that it improves instant approval rates by leveraging partner data where applicable.

Still anther advantage is that the present invention provides instant account usage to all instantly approved applicants.

Another advantage of the present invention is that it provides reporting to monitor service level agreements ("SLAs") at a partner and/or channel level.

Another advantage of the present invention is that it provides a selected range of instant enabled products by partner with minimal development.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

I. Overview

Figure 1:
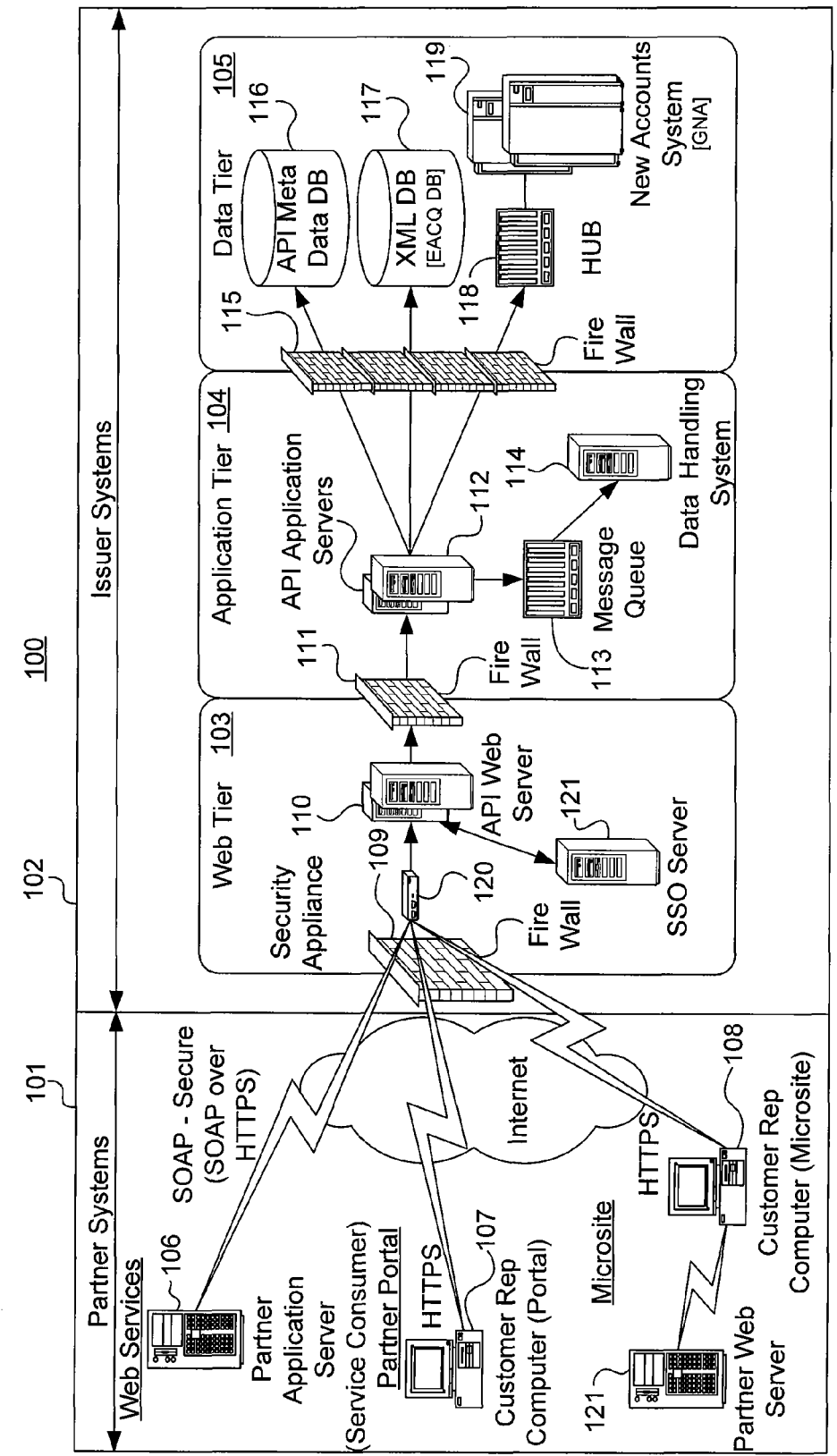
FIG. 1 is a block diagram of an exemplary acquisition partner interface system in which the present invention, in an embodiment, would be implemented.

The present invention is directed to a system, method and computer program product for an acquisition partner interface for integrating multiple partner channels into a transaction account issuer platform to allow partner customers to apply for transaction accounts.

The present invention is now described in more detail herein in terms of an exemplary acquisition partner interface for allowing a partner's customers to apply for a new transaction account through a transaction account issuer's partner. This is for convenience only and is not intended to limit the application of the present invention. In fact, after reading the following description, it will be apparent to one skilled in the relevant art(s) how to implement the following invention in alternative embodiments (e.g., for applying for products and services other than new transaction accounts).

The terms "user," "end user," "consumer," "customer," "participant," and the plural forms of these terms are used interchangeably throughout herein to refer to those persons or entities capable of accessing, using, being affected by and/or benefiting from the tool that the present invention provides for an acquisition partner and transaction account issuer to allow partner customers to apply for transaction accounts.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "Web service," "application service" and the plural forms of these terms are used interchangeable throughout herein to refer to describes a standardized way of integrating Web-based applications using well known open standards such as Extensible Markup Language (XML), Simple Object Access Protocol (SOAP), Web Services Description Language (WSDL), Universal Description Discovery and Integration (UDDI) and the like, over an Internet protocol backbone. XML is used to tag the data, SOAP is used to transfer the data, WSDL is used for describing the services available and UDDI is used for listing what services are available. Used primarily as a means for businesses to communicate with each other and with clients, Web services allow organizations to communicate data without intimate knowledge of each other's systems behind the firewall. Unlike traditional client/server models, such as a Web server/Web page system, Web services do not provide the user with a graphical user interface ("GUI"). Web services instead share business logic, data and processes through a programmatic interface across a network. The Web service can be added to a GUI (such as a Web page or an executable program) to offer specific functionality to users.

The terms "microsite," "minisite" and the plural forms of these terms are used interchangeably throughout herein to refer to a separate page of a website that has a separate URL than its home page and is used to provide information about and/or promote something that is related to the home page.

A "portal" is a website or service that provides access to a number of sources of information and facilities, such as a directory of links to other websites, search engines, email, online shopping, and the like.

A "transaction account" (as the term is used herein) is an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A "financial transaction instrument" may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication device, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., a rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1 N_2 N_3 N_4 N_5 N_6 N_7 N_8 N_9 N_{10} N_{11} N_{12} N_{13} N_{14} N_{15} N_{16}$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

The present invention provides multiple interface options to a transaction account issuer's partners to be able to connect to back end systems for the purpose of allowing the partner's customers to apply for credit. Having these interface options allow partners to reach and interact with the transaction account issuer's system with limited effort and in some case with no more than a desktop computer connect to the Internet. Each environment has a unique set of benefits.

A first interface type is a Web services option. The Web services option is a Web service hosted by the transaction account issuer which provides an interface to the partner. The partner develops their own form for collecting information and uses the Web service provided by the transaction account issuer for processing the information. A Web services solution is appropriate when the partner wants to own and control the entire customer experience. From the transaction account issuer's perspective, a Web services solution can shorten the application process because in a Web services environment the transaction account application experience is fully integrated with the purchase process (e.g., the ability to pre-fill customer application information). In addition, partners can more easily share data with the transaction account issuer. Moreover, because prescreened information can be used, the Web services environment facilitates increased approval rates and reduces fraud.

A second interface type is a microsite. The microsite option is also in the form of a Web page provided by the transaction account issuer. However, the look and feel of the partner's current website is maintained. The Web page content and functionality is provided by the transaction account issuer, but is formatted and branded to look like the partner's site. The transaction account issuer owns and controls the applications pages, including additional features, such as providing disclosure updates.

A third interface type is a partner portal. The partner portal is a private (URL) hosted by the transaction account issuer. Partner's have the ability to sign into a private website hosted by the transaction account issuer to capture applications and perform instant approval decision making processes and usage functions. In this solution, the partner collects information from its customers and uses the partner portal to key in this information on behalf of the customer. The partner does not own and control the entire customer experience in a partner portal environment. A portal is similar to a microsite in that both the partner portal and microsite environments require minimal development effort for the partner.

II. System

FIG. 1 depicts a block diagram of an exemplary acquisition partner integration system 100 operable to interface partners through a Web services, microsite and/or Web portal channels, which the present invention, in an embodiment, would be implemented.

System 100 is divided into two systems, the partner system 101 and the issuer system 102. In addition, three types of interfaces (i.e., partner channels) are illustrated, the Web services channel, the microsite channel and the portal channel.

System 100 includes a partner application server 106 for hosting a partner site in a Web services channel environment. Partner application server 106 provides a potential customer browsing on the partner site with an offer to subscribe to an issuer's transaction instrument, and if the customer accepts the offer, provides the potential customer with an application form that the applicant completes. Partner application server 106 also verifies the application data and translates it into an XML infoset or Character Large Object (CLOB). In an embodiment, partner application server 106 invokes the transaction account issuer's Web service via SOAP over HyperText Transfer Protocol Secure (HTTPS) and passes the application XML data as a part of the SOAP payload, along with some meta information as a part of the payload.

The incoming SOAP call is intercepted by a security appliance 120 which allows the issuer to securely publish its Web services for its partners. In particular, security appliance 120 analyzes the security block of the SOAP payload. If the certificate exchange and signature verification is successful the message is passed on to the appropriate service end point. In this embodiment, the security appliance 120 is only used with the Web services channel. The microsite and portal channels include a different security feature as will be explained in more detailed below.

In system 100, the service end point is an acquisition partner interface (API) application server 112 for hosting the Web service. The SOAP payload includes a partner identifier. API application server 112 extracts the partner identifier and compares it with corresponding information stored in its own data repository, API meta data database 116, and identifies the partner privileges (e.g., which issuer products or services a partner is permitted to promote). Once the partner is verified, application server 112 unloads the application XML data from the SOAP payload and validates it to check for data consistency.

System 100 further includes a data handling system 114 connected through a message queue 113. As a part of the validation, an address provided by the customer is verified with an address lookup service provided by data handling system 114.

API application server 112 also stores the XML application data on XML database 117 and generates a unique identifier to identify each transaction account application.

Application server 112 also invokes a handler routine which passes the XML application data, through a hub 118, to a new accounts acquisition system 119 which makes decisions such as to approve, reject, counteroffer the terms of a transaction account application.

System 100 further includes a partner Web server 121 for hosting a microsite. While on the partner's website through a customer representative computer 108 the customer (or customer representative) can switch to the transaction account issuer's URL and connect to a page hosted by the transaction account issuer via HTTPS. Once connected to the issuer's system through API Web server 110, the customer is provided with one or more offers (e.g., card product options). If an offer is accepted, upon product selection an application form is provided for the applicant to fill out. Once the application form information is verified by partner Web server 121, the application data are submitted to the issuer system API application server 112 for processing. Partner information also is communicated as part of the request along with a return URL. API application server 112 verifies a partner identifier with corresponding information stored in its own data repository, API meta data database 116, and identifies the partner privileges (e.g., which issuer products a partner is permitted to promote). In addition, API application server 112 validates the XML data to check for data consistency. In addition to this data consistency validation other validations are performed. For example, the address provided by the customer is compared to data stored in data handling system 114.

As described above, application server 112 also communicates the application XML data to XML database 117 for storage and generates a unique identifier for identifying each card application. Application server 112 also invokes a handler routine which passes the application XML data to a new accounts acquisition system 119 through the hub 112. New accounts acquisition server 119 is used to make decisions such as to approve, reject, counteroffer the terms of an application for credit.

System 100 further includes a customer representative desktop 107 which is in communication with API Web server 110 through a portal via HTTPS. A potential customer shopping at a partner store or by telephone with a telemarketing partner accepts an offer for subscribing for the issuer's transaction account (or more particularly to a transaction instrument product). The partner logs onto the issuer's Web server from customer representative computer 107 computer and is authenticated (e.g., via a secure sign-on (SSO) protocol) through SSO server 121.

Upon successful logon, application server 112 verifies with its own data repository, API meta data database 116 and identifies the partner privileges. Based on partner privileges stored on API meta data database 116 and product selection, an application form is communicated to customer representative computer 107 which the partner completes, verifies and submits for processing on behalf of the customer.

Several security features are integrated into system 100. All points of entry into the issuer's internal system are protected through firewalls 109, 111 and 115. In addition, all content and sensitive data are stored in a trusted domain of the issuer's internal system. Confidential data are encrypted over open networks using well known encryption techniques (e.g., 128 bit secure socket layer or SSL).

III. Process

Figure 2:
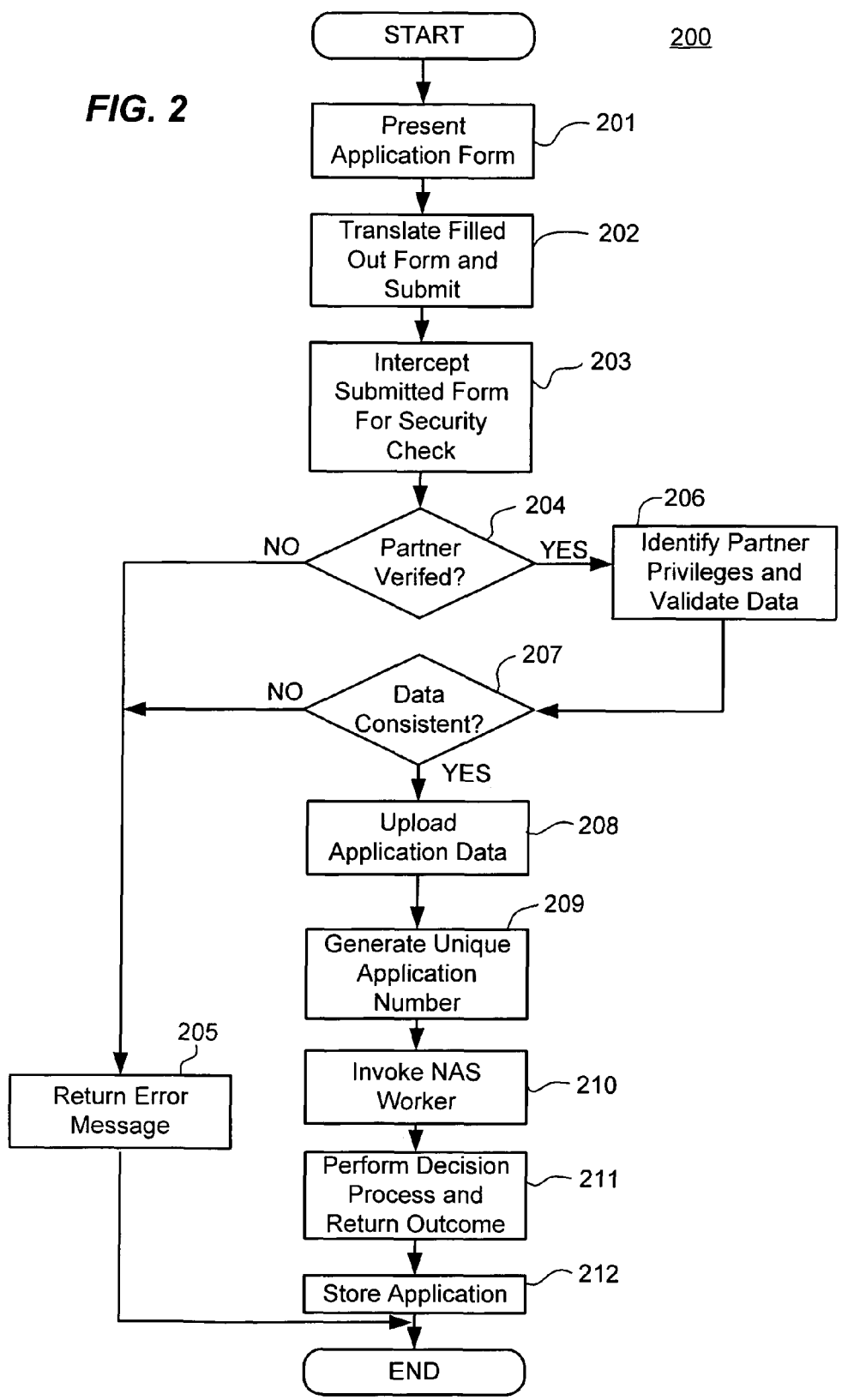
FIG. 2 is a flowchart illustrating a partner acquisition process according to one embodiment of the present invention.

Referring to FIG. 2, a flowchart illustrating a multi-channel acquisition partner interface process 200, according to one embodiment of the present invention, is shown.

Process 200 begins at step 201, when a user browsing on a partner site connects to a Web page hosting an application form for subscribing to an issuer's product (e.g., transaction instrument or services). In the case of the Web services channel, as described above, the Web page is hosted on partner application server 106. In the case of the microsite channel, the Web page is provided by API Web server 110 through partner Web server 121. And, in the case of the partner portal channel, the Web page is hosted on API Web server 110. In all three partner channel environments, the user completes the application form and the data is verified and submitted for processing.

As explained above, information for identifying the partner is communicated to API application server 112. This information can be aggregated with the form data supplied by an applicant delivered separately or embedded within the URL. The applicant data includes information such as name, address, date of birth, mother's maiden name, telephone number, security password and the like.

At step 202 the application data is translated into an XML data file and submitted to issuer system 102 over HTTPS. The received data is intercepted for a security check at step 203. If the data passes the security check, it is forwarded to application server 112. API application server 112 extracts the partners unique identifier and verifies it by comparing it to the issuer's system 102 own data repository within the data handling system (e.g., API Meta Data database 116) as shown at step 204. If verified, API application server 112 also identifies the partner privileges and validates the data for consistency at step 206. If the partner is not verified, at step 205 an appropriate error message is communicated back to user.

If a determination is made at step 207 that the application data is consistent by both the partner application server 106, as well as the API application server 112 the XML application data is uploaded to XML database 117, as shown at step 208. As mentioned above, as a part of this validation, the address provided by the customer also is verified by data handling system 114. Next, a unique application number is generated at step 209. At step 211, API application server 112 passes the XML application data to a new accounts server 119 to open and activate an account for processing the application, which decides whether the application should be approved, denied, or whether another offer should be made. More particularly, new accounts server 119 performs the decision process at step 211 based on rules which evaluate the results of an applicant's credit score and other application data as will be appreciated by one skilled in the relevant art(s) after reading the description herein. If a transaction instrument is being applied for, card number is assigned and the pertinent account information is communicated to the site where the application originated. Similarly, if other products or services are being applied for, corresponding outcomes are returned to the site where the application originated. In addition, the application is finalized, locked and archived for predetermined time in a database within the issuer's internal system 102 (e.g., XML database 117) as shown at step 212.

The present invention allows multiple channels to communicate with issuer system based on rules set up for each partner. These rules describe the partner's particular acquisition channel type (e.g., Web service, microsite, portal, etc.) and associate relevant partner information. In addition, by centralizing the data flow through API application server 112, the present invention reduces the issuer's system complexity while improving application processing speed and the user's overall experience. In addition to having specific rules for individual partners, other rules can be reused among certain partners, thereby providing consistency.

Figure 3:
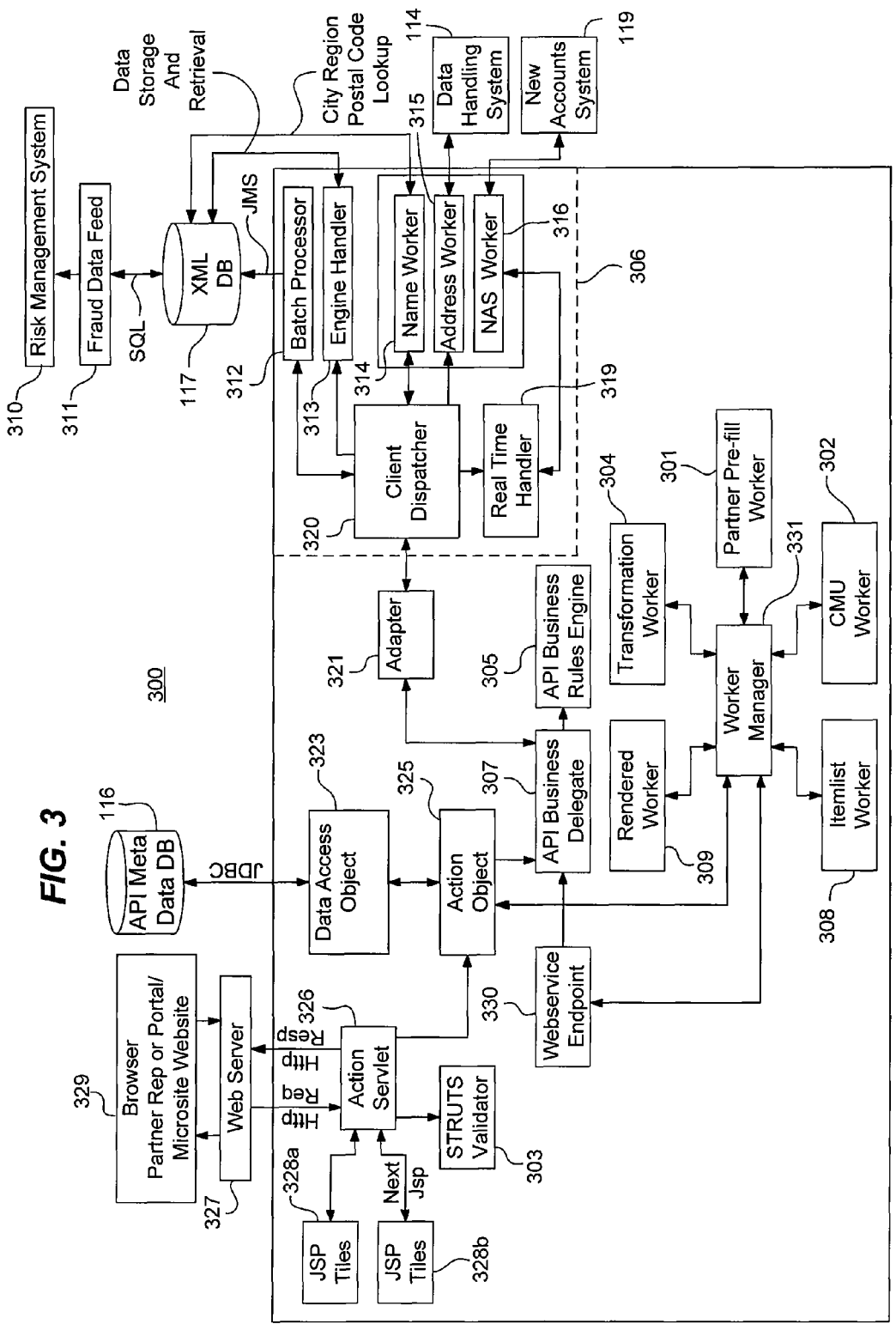
FIG. 3 depicts a logical flow in an acquisition partner interface system according to one embodiment of the present invention.

FIG. 3 depicts a logical flow 300 in an acquisition partner interface system, according to one embodiment of the present invention, illustrating the use and reuse of code blocks, rules, components, handlers and the like. Action servlet 326 is executed by API application server 112 to handle requests and responses between the partner or issuer's Web server 110 or 121 (both of which are depicted in FIG. 3 as Web server 327) and the end user's terminal. In one embodiment, action server 325 is written based on an open framework for building Java-based Web applications called STRUTS, described at http://struts.apache.org. Action servlet 326 manages the actions performed on the Web pages shown on the partner system 101 by sending back appropriate Java Server Page (JSP) tiles 328a and 328b which make up the page or pages displayed through a browser 329 at the partner's terminal computer (e.g., customer representative computer 107 and 108) or through a GUI operated by partner application server 106. The JSP tiles can be reused or defined for use only for a particular partner. As new pages are generated (e.g., new partners added), additional JSP tiles are created, if necessary. As a user inputs data into a form it is validated using a STRUTS validator 303.

Servlet 326 also communicates action requests to an action object 325 which is a routing that handles the request by submitting it to the appropriate component within the issuer system 102. For example, if the STRUTS validator 303 requests validation of a partner's identification, action servlet 326 forms a corresponding action request and sends it to action object 325, which in turn verifies the partner's identification against one stored in API Meta Data database 116. Access between API Meta Data database 116 and action object 325 are through data access object 323.

Business rules are stored in API business rules engine 305 which is handled by API business delegate 307. These rules provide a set of operations to be performed in accordance with the data received from partner system 101. A business rule can be used to decide whether the data satisfies a constraint. For instance, if the partner is in Florida, API business delegate 307 locates the relevant rules stored in API business rules engine 305 and determines whether any constraints on the partnership exist based on the fact that the transaction has been initiated in Florida.

If all the validation requests are successful, an electronic acquisition (EACQ) system 306 is called to communicate the validated data to the issuer's downstream processing systems. An exemplary embodiment of the EACQ system is described in commonly-owned U.S. application Ser. No. 10/718,004, entitled Electronic Acquisition System and Method Using a Portal to Facilitate Data Validation and to Provide A Universal Client Interface, filed on Nov. 20, 2003, which is hereby incorporated by reference.

Worker manager 331 is a routine that manages several code blocks referred to as "workers". Action object 325 communicates requests for data to worker manager 331. Worker manager 331, in turn, manages the worker blocks of code which contain or have access to the corresponding responses. Content management utility (CMU) worker 302, for instance, retrieves data from a content management depository which contains static contents to be displayed on Web pages (e.g., partner logo). Partner pre-fill worker 301 provides pre-fill functionality if the pre-fill data is available from the partner (e.g., applicant's name, address, telephone number, and the like). Transformation worker 304 transforms the application XML data to an internal format used by issuer system 102. Itemlist worker 308 receives and transmits the contents of drop boxes to the user interface (e.g., browser, partner representative computer connected through portal, microsite, 329). Rendered worker 309 builds an HTML/XML block for the client, which can be rendered or shown in a browser/client screen.

Webservice endpoint 330 is the entry point into the API webservice application 112, for the components running on the partner application server 106, which require to use the issuer services Adapter 321 insulates the core application logic from the EACQ system 306. Insulating the EACQ system 306 allows it to be a modular component of system 100. This modularity provides scalability for the architecture. EACQ system 306 provides a set of common services needed to validate the XML data as well as communicate with the new accounts system 119. EACQ system 306 includes a client dispatcher 320, which coordinates the invocation of a service and helps share workers across concurrent requests coming into the issuer system 100. EAQC system 306 includes a collection of utility workers such as a name worker 315 which matches the name on the request against a list of famous names to whet out fraudulent application, an Address worker 315 which is used to verify whether an address is correct, an NAS worker 316 which facilitates connections to the new accounts system 119, a real time handler 319, which allows the issuer system to request for instant processing. Apart from the workers mentioned the EACQ system 306 also includes an engine handler which takes the information passed from a partner system's browser and stores it in the XML database 117, a batch processor 312 that runs a batch process which retrieves data at predetermined times and communicates the data to the new accounts system 119 for processing. Risk management system 310 receives information from XML database 117 through fraud datafeed 311, and processes the information to detect the occurrence of any intentional deception.

IV. Example Implementations

Figure 4:
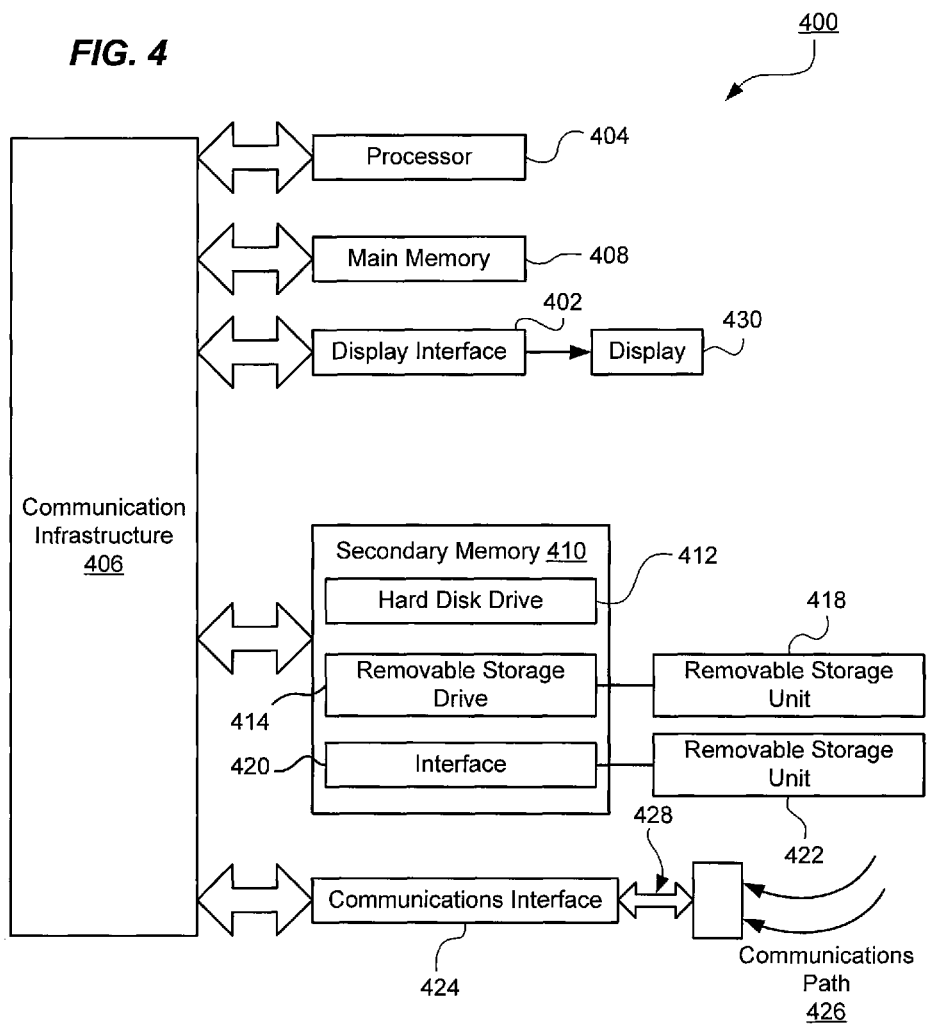
FIG. 4 is a block diagram of an exemplary computer system useful for implementing the present invention.

The present invention (i.e., system 100, process 200, logical flow 300 or any part(s) or function(s) thereof) may be implemented using hardware, software or a combination thereof and may be implemented in one or more computer systems or other processing systems. Useful machines for performing the operation of the present invention include general purpose digital computers or similar devices. In fact, in one embodiment, the invention is directed toward one or more computer systems capable of carrying out the functionality described herein. An example of a computer system 400 is shown in FIG. 4.

The computer system 400 includes one or more processors, such as processor 404. The processor 404 is connected to a communication infrastructure 406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 400 can include a display interface 402 that forwards graphics, text, and other data from the communication infrastructure 406 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418 represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 414, a hard disk installed in hard disk drive 412, and signals 428. These computer program products provide software to computer system 400. The invention is directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:
receiving, by a computer-based system for interfacing a plurality of disparate partner systems to a transaction account issuer system, a request for a new transaction account from a disparate partner system, wherein the request is received through one of: a web service, a partner portal, and a partner microsite, and wherein the at least one of the web service, the partner portal, and the partner microsite are formatted to resemble a website associated with the partner;
identifying, by the computer-based system, a business partner associated with the request for the new transaction account;
delegating, by the computer-based system, an action associated with the request for the new transaction account to a handler, wherein the handler is at least one of an action object, an action servlet and a worker manager;
invoking, by the computer-based system and using the handler, a worker to perform the action, wherein the worker is a code block;
communicating, by the computer-based system, an outcome related to the action; and
re-using, by the computer-based system, the worker and the handler to process another request for a new transaction account.

2. The method of claim 1, wherein the identifying further comprises extracting a partner identifier from an XML file associated with the request.

3. The method of claim 2, wherein the XML file includes personal information associated with a transaction account applicant.

4. The method of claim 1, further comprising verifying, by the computer-based system, an identifier associated with the business partner.

5. The method of claim 1, further comprising transmitting, by the computer-based system and using at least one of: a content management utility worker, a partner pre-fill worker, a transformation worker, an itemlist worker, and a rendered worker, data associated with a user interface.

6. The method of claim 1, further comprising processing, by the computer-based system and using collection of utility workers, the request for the new transaction account.

7. The method of claim 1, further comprising authenticating, by the computer-based system, the partner system.

8. The method of claim 1, further comprising communicating, by the computer-based system, an action to the transaction account issuer system through an adapter coupled to the transaction account issuer system and a delegate, wherein the delegate deploys actions to the handler.

9. The method of claim 1, further comprising aggregating, by the computer-based system, data associated with the request for the new transaction account and data stored in the transaction account issuer system, and communicating the aggregated data to a handler.

10. The method of claim 1, further comprising receiving, by the computer-based system, the request for the new transaction account through a web service that is provided by the transaction account issuer system, wherein the partner provides a webpage for collecting application data.

11. The method of claim 1, further comprising receiving, by the computer-based system, the request for the new transaction account through a partner portal that comprises a private URL hosted by a transaction account issuer.

12. The method of claim 1, wherein the identifying the business partner associated with the request is performed by an API application server.

13. The method of claim 1, wherein the delegating the action associated with the request to the handler is performed by an API application server.

14. The method of claim 1, wherein the invoking the worker to perform the action is performed by an API application server.

15. The method of claim 1, wherein the delegating the action associated with the request to the handler is performed by an electronic acquisition ("EACQ") system.

16. The method of claim 1, wherein the invoking the worker to perform the action is performed by an electronic acquisition ("EACQ") system.

17. The method of claim 1, further comprising communicating, by the computer-based system and through an electronic acquisition system ("EACQ"), the request for the new transaction account to the transaction account issuer system.

18. A system comprising:
a tangible, non-transitory memory communicating with a processor for interfacing a plurality of disparate partner systems to a transaction account issuer system,
the tangible, non-transitory memory having instructions stored thereon that, in response to execution by the processor, cause the processor to perform operations comprising:
receiving, by the processor, a request for a new transaction account from a disparate partner system, wherein the request is received through one of: a web service, a partner portal, and a partner microsite, and wherein the at least one of the web service, the partner portal, and the partner microsite are formatted to resemble a website associated with the partner;
identifying, by the processor, a business partner associated with the request for the new transaction account;
delegating, by the processor, an action associated with the request for the new transaction account to a handler, wherein the handler is at least one of an action object, an action servlet and a worker manager;
invoking, by the processor and using the handler, a worker to perform the action, wherein the worker is a code block;
communicating, by the processor, an outcome related to the action; and
re-using, by the processor, the worker and the handler to process another request for a new transaction account.

19. An article of manufacture including a non-transitory, tangible computer readable medium having instructions stored thereon that, in response to execution by a computer-based system for interfacing a plurality of disparate partner systems to a transaction account issuer system, cause the computer-based system to perform operations comprising:
receiving, by the computer-based system, a request for a new transaction account from a disparate partner system, wherein the request is received through one of: a web service, a partner portal, and a partner microsite, and wherein the at least one of the web service, the partner portal, and the partner microsite are formatted to resemble a website associated with the partner;
identifying, by the computer-based system, a business partner associated with the request for the new transaction account;
delegating, by the computer-based system, an action associated with the request for the new transaction account to a handler, wherein the handler is at least one of an action object, an action servlet and a worker manager;
invoking, by the computer-based system and using the handler, a worker to perform the action, wherein the worker is a code block;
communicating, by the computer-based system, an outcome related to the action; and
re-using, by the computer-based system, the worker and the handler to process another request for a new transaction account.

* * * * *